US009697855B1

(12) United States Patent
Liu et al.

(10) Patent No.: US 9,697,855 B1
(45) Date of Patent: Jul. 4, 2017

(54) PERPENDICULAR MAGNETIC RECORDING (PMR) WRITE HEAD WITH MULTIPLE LAYER TRAILING SHIELD

(71) Applicant: Headway Technologies, Inc., Milpitas, CA (US)

(72) Inventors: Ying Liu, San Jose, CA (US); Yuhui Tang, Milpitas, CA (US); Yue Liu, Fremont, CA (US); Yiming Wang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/257,341

(22) Filed: Sep. 6, 2016

(51) Int. Cl.
*G11B 5/127* (2006.01)
*G11B 5/60* (2006.01)

(52) U.S. Cl.
CPC .......... *G11B 5/6082* (2013.01); *G11B 5/1278* (2013.01)

(58) Field of Classification Search
None
See application file for complete search history.

(56) References Cited

U.S. PATENT DOCUMENTS

| 8,284,516 B1* | 10/2012 | Tang | G11B 5/1278 360/125.03 |
| 8,347,489 B2 | 1/2013 | Hong et al. | |
| 8,498,079 B1* | 7/2013 | Song | G11B 5/1278 360/125.3 |
| 8,582,241 B1 | 11/2013 | Yu et al. | |
| 8,810,964 B2* | 8/2014 | Gao | G11B 5/1278 360/125.3 |
| 9,299,367 B1* | 3/2016 | Tang | G11B 5/127 |
| 9,361,912 B1* | 6/2016 | Liu | G11B 5/187 |
| 9,406,317 B1* | 8/2016 | Tang | G11B 5/3116 |
| 9,508,365 B1* | 11/2016 | Zheng | G11B 5/39 |
| 9,536,548 B1* | 1/2017 | Narayana | G11B 5/3113 |
| 2012/0050915 A1 | 3/2012 | Hong et al. | |
| 2016/0307586 A1* | 10/2016 | Liu | G11B 5/187 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

\* cited by examiner

*Primary Examiner* — Will J Klimowicz
(74) *Attorney, Agent, or Firm* — Saile Ackerman LLC; Stephen B. Ackerman

(57) ABSTRACT

Bits per inch (BPI) is increased, and faster risetime is achieved while adjacent track erasure (ATE) is maintained at an acceptable level by inserting a 10-12 kG magnetic (TS0) layer between a 19-24 kG hot seed layer and 16-19 kG magnetic layer in a trailing shield structure at the ABS. A back portion (TY0) of the 10-12 kG magnetic layer is formed in a back gap connection between a back portion of the 16-19 kG magnetic layer and a trailing side of the main pole layer. A front side of the TY0 layer is 1-2 microns from the ABS and thereby improves BPI and writer speed. Accordingly, throat height in the write head may be reduced to less than 500 nm and thereby enables better bit error rate (BER). The TS0 layer is responsible for maintaining clean ATE near a far side of the writer track.

27 Claims, 11 Drawing Sheets

PERPENDICULAR MAGNETIC RECORDING (PMR) WRITE HEAD WITH MULTIPLE LAYER TRAILING SHIELD

TECHNICAL FIELD

The present disclosure relates to a shield structure in a PMR write head wherein a trailing shield has a multilayer design with a high magnetization saturation (Ms) hot seed layer on the write gap, an uppermost 16-19 kG magnetic layer, and a 10-12 kG magnetic middle layer to improve bits per square inch (BPI) performance, and increase writer speed while maintaining acceptable adjacent track erasure (ATE).

BACKGROUND

A PMR write head has a main pole with a small surface area at an air bearing surface (ABS), and coils that conduct a current and generate magnetic flux in the main pole such that the magnetic flux exits through a write pole tip and enters a magnetic medium (disk) adjacent to the ABS during a write process. Magnetic flux is used to write a selected number of bits in the magnetic medium and typically returns to the main pole through a trailing loop pathway. The trailing loop comprises a trailing shield structure with a PP3 shield portion that arches over the write coils and connects to a top surface of the main pole layer through a back gap magnetic connection (BGC). The trailing shield structure at the ABS typically has a high Ms (19-24 kG) layer called a hot seed layer that adjoins a top surface of the write gap. A good hot seed response is required to reduce stray fields in the side shields, and in a leading shield when present. Above the hot seed layer at the ABS is a second trailing shield layer with a lower Ms (16-19 kG) to control ATE. Generally, the second trailing shield and BGC are deposited (plated) at the same time. Subsequently, the PP3 trailing shield is deposited on the second trialing shield and BGC, and has a front side that is recessed from the ABS.

A PMR head which combines the features of a single pole writer and a double layered medium (magnetic disk) has a great advantage over longitudinal magnetic recording (LMR) in providing higher write field, better read back signal, and potentially much higher areal density. In addition to conventional magnetic recording (CMR), shingled magnetic recording (SMR) is another form of PMR and has been proposed for future high density magnetic recording by R. Wood et al. in "The Feasibility of Magnetic Recording at 10 Terabits Per Square Inch on Conventional Media", IEEE Trans. Magn., Vol. 45, pp. 917-923 (2009). Track widths are defined by the squeeze position or amount of overwrite on the next track rather than by write pole width as in today's hard disk drives. One of the main advantages of shingled writing is that write pole width no longer needs to scale with the written track width. Thus, the opportunity for improved writability and higher device yield is not restricted by pole width as a critical dimension to be tightly controlled. Secondly, adjacent track erasure (ATE) becomes less of an issue because tracks are written sequentially in a cross-track dimension and only experience a one-time squeeze from the next track.

For both conventional magnetic recording (CMR) and shingle magnetic recording (SMR), continuous improvement in storage area density is required for a PMR writer. A write head that can deliver or pack higher bits per inch (BPI) and higher tracks per inch (TPI) is essential to the area density improvement. Improved TPI is generally realized through better side shield designs while BPI on-track performance is promoted primarily through high Ms material in the trailing shield.

It is desirable to modify the trailing shield layout in order to improve writer speed and enhance BPI for advanced writer technology. However, coil thickness, coil spacing, and trailing shield thickness are parameters that limit adjustments to the current trailing shield structure. Improved designs have heretofore been prevented by significantly higher process complexity and higher cost necessary to implement significant changes in the aforementioned parameters. Therefore, an improved trailing shield design is needed that can deliver higher writer speed and BPI to meet the requirements for advanced PMR writers, and that can be fabricated with a process and cost acceptable to large scale manufacturing.

SUMMARY

One objective of the present disclosure is to provide a trailing shield structure for a PMR writer that enhances BPI and writer speed compared with state of the art writer designs while maintaining acceptable ATE in near and far side positions of the recording track.

Another objective of the present disclosure is to provide a method of making the trailing shield structure of the first objective with conventional materials and processes to avoid a substantial cost increase in the fabrication thereof.

According to one embodiment of the present disclosure, these objectives are achieved with a multilayer scheme for a trailing shield structure comprising a high Ms (19-24 kG) hot seed layer that is formed on the write gap, and a 16-19 kG magnetic layer with a front portion at the ABS and a back portion serving as a back gap connection (BGC) between a PP3 trailing shield and the main pole layer. There is also a 10-12 kG magnetic layer with a front portion (TS0 layer) between the hot seed layer and front portion of the 16-19 kG magnetic layer, and a back portion (TY0 layer) that serves as a top yoke between the main pole layer and BGC. Insertion of the 10-12 kG magnetic layer in the trailing shield structure is responsible for two key performance improvements. First, the TS0 layer allows better control of ATE while enabling a lower bit error rate (BER) since the TS0 throat height (TS0_TH) is smaller than the conventional trailing shield throat height. In other words, there is a larger opening between the main pole and 16-19 kG trailing shield (beyond the TS0_TH) than between the hot seed layer and main pole layer in a conventional design. Secondly, insertion of the TY0 layer between the BGC and main pole allows the coil-BGC spacing to be maintained while simultaneously providing a front side of the TY0 closer to the ABS. As a result, write speed is enhanced without introducing additional process complexity.

From a down-track cross-sectional view, leading and trailing sides of the main pole proximate to the ABS may be tapered with respect to a center plane that bisects the main pole and is formed orthogonal to the ABS. As a result, the write gap in some embodiments is tapered with respect to the center plane and a backside thereof is a greater down-track distance from the center plane than the front side of the write gap at the ABS. Moreover, the write gap has a first thickness "t" between the main pole trialing side and hot seed layer at the ABS and up to the TS0_TH, and a second thickness greater than "t" between the 16-19 kG magnetic layer and main pole trailing side at heights greater than the TS0_TH. A first set of coils is formed between the backside of the front 16-19 kG trailing shield and front side of the BGC, and a second set of coils is between the first set and the PP3 trailing shield in a so-called double deck design.

From an ABS cross-sectional view in an embodiment where the side shields and leading shield form an all wrap around (AWA) shield structure with the trailing shield, each side shield is separated from a main pole side by a side gap, and the leading shield is separated from the main pole leading side by a leading gap. Each side shield top surface adjoins a bottom surface of the 10-12 kG magnetic layer along a first plane that also forms an interface between the write gap and trailing side of the main pole layer. Each side shield bottom surface adjoins a top surface of the leading shield along a second plane that is parallel to the first plane and is orthogonal to a third plane that bisects the main pole in a down-track direction. The write gap and hot seed layer have a cross-track width that is greater than the track width of the PMR writer.

The present disclosure also encompasses a method for forming an AWA shield with the multilayer trailing shield structure described herein. According to one embodiment from a cross-sectional view, a 10-19 kG side shield layer is formed on a leading shield and has a top surface formed along the first plane. An opening with a trapezoidal shape is formed in the side shield layer such that a bottom of the opening is along the second plane at a top surface of the leading shield. Two sloped sides connect the top surface and bottom of the opening. A conformal gap layer is deposited on the two sloped sides and bottom of the opening to partially fill the opening, and thereby forms side gaps and leading gap, respectively. Thereafter, the main pole layer is plated to fill the opening. A chemical mechanical polish (CMP) process is performed to form a main pole trailing side at the first plane. Next, the write gap and hot seed magnetic layer are sequentially deposited and patterned to provide each with a first cross-track width at the ABS that is greater than the track width of the main pole trailing side. A dielectric layer is deposited on the main pole trailing side and a first opening formed therein above the hot seed layer at the ABS, and a second opening above a back portion of the main pole. The 10-12 kG magnetic layer is then deposited in the first and second openings to yield a 10-12 kG trailing shield layer on the top surface and sides of the hot seed layer, and a 10-12 kG bottom layer in the back gap connection, respectively. Thereafter, a 16-19 kG magnetic layer is plated with a front portion on the 10-12 kG trailing shield layer at the ABS, and a back portion as an upper layer in the back gap connection.

DETAILED DESCRIPTION

Figure 1A:
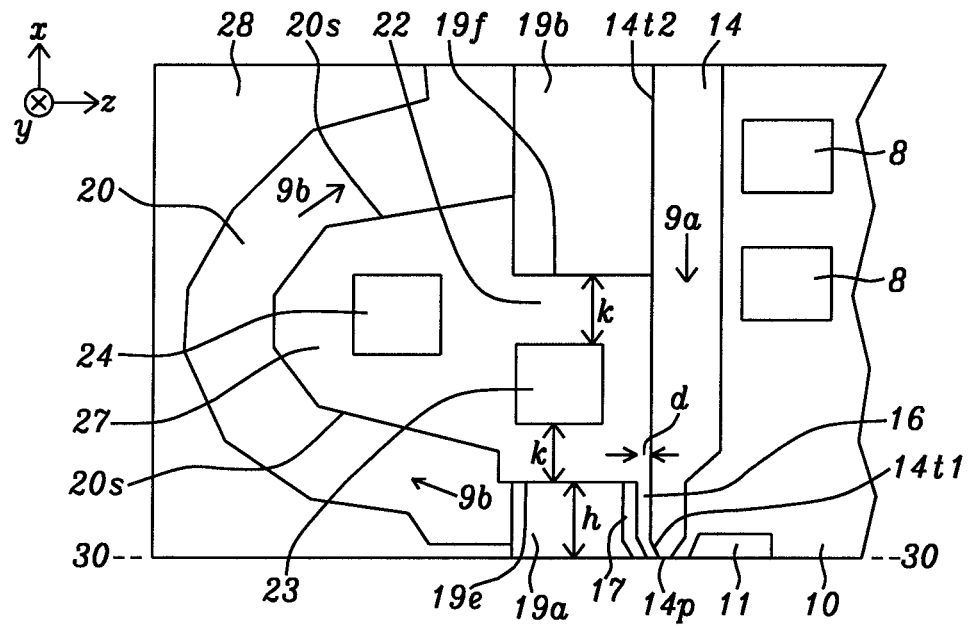
FIG. 1a is a down-track cross-sectional view of a process of record (POR) shield design for a PMR writer wherein the trailing shield at the ABS consists of a lower hot seed layer and an upper 16-19 kG layer that both extend a first height from the ABS.

The present disclosure relates to an all wrap around (AWA) shield structure in a PMR write head wherein a multilayer trailing shield includes a 10-12 kG magnetic layer in order to maintain acceptable ATE while enabling a faster writer speed and improving BPI. The shield structure disclosed herein is compatible with a variety of main pole designs including those with one or both of a tapered leading side and tapered trailing side. Moreover, the PMR writer may have a combined read head/write head structure. In the drawings, the y-axis is a cross-track direction, the z-axis is a down-track direction, and the x-axis is in a direction orthogonal to the ABS and towards a back end of the device. The term "thickness" refers to a down-track dimension, "height" relates to a distance along the x-axis direction orthogonal to the ABS, and "width" relates to a cross-track distance.

Referring to FIG. 1a, a down-track cross-sectional view of a POR shield design previously fabricated by the inventors is shown wherein a main pole 14 has a pole tip 14p at the ABS 30-30, a first tapered trailing side 14t1 at the ABS, and a second trailing side 14t2 extending along an x-axis direction from the back end of the first tapered trailing side. There are three sets of driving coils 8, 23, 24 in a 1+1+2T (double deck) design to generate magnetic flux 9a that exits through the pole tip 14p and is used to write a plurality of magnetic bits on a magnetic medium (not shown). Magnetic flux 9b re-enters the write head and passes through a trailing magnetic loop comprising a hot seed layer 17, trailing shield layer 19a, PP3 trailing shield 20, and back gap connection (BGC) 19b before reaching a back portion of the main pole on trailing side 14t2. Write gap 16 has a thickness d between trailing sides 14t1, 14t2 and the hot seed layer. In this example, there is no leading loop for magnetic flux from the magnetic medium that enters the leading shield to return to a back portion of the main pole. Trailing shield layer 19a extends from the ABS to back side 19e that is at a throat height h from the ABS.

Driving coils 23 are formed within dielectric layer 22 that separates trailing shield backside 19e from front side 19f of the BGC. There is a minimum distance k of around 0.3 micron along the x-axis direction between coils 23 and front side 19f, and between coils 23 and back side 19e in order to prevent flux leakage to magnetic layers 19a, 19b, and to allow greater process window for reproducibly making a dielectric gap with dimension k. Driving coils 24 are within dielectric layer 27 and between inner sides 20s of the PP3 trailing shield. The main pole is formed on a sub-structure 10 that typically includes multiple dielectric layers and magnetic layers as appreciated by those skilled in the art. Leading shield 11 is shown within the sub-structure. In some designs (not shown), the main pole may include a bottom yoke in a bottom portion comprising a side 14b facing driving coils 8. Moreover, a top yoke (not shown) may be inserted between main pole trailing side 14t2 and BGC 19b. Protection layer 28 is a dielectric material and is provided on a side of the PP3 shield opposite to the sides 20s.

Figure 1B:
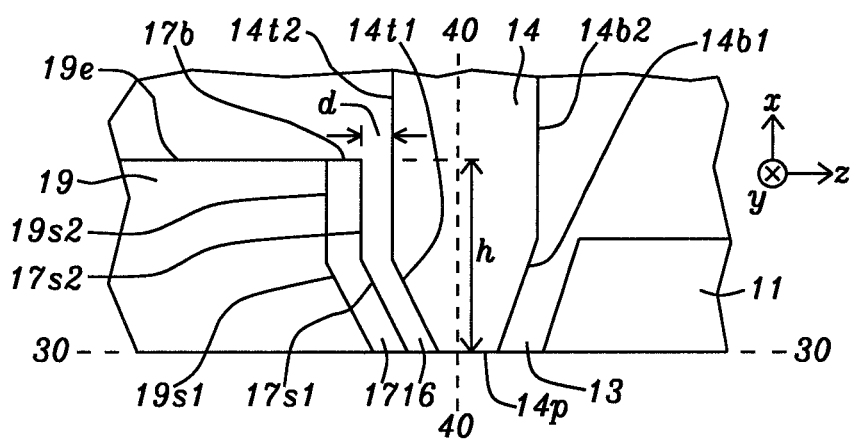
FIG. 1b is an enlarged view of FIG. 1a that shows the main pole and surrounding layers at the ABS.

As shown in FIG. 1b, an enlarged view of the write head structure near the main pole tip 14p in FIG. 1a indicates the main pole may have a tapered leading side 14b1 with a front end at the ABS 30-30, and a second leading side 14b2 connected to a back end of the tapered leading side. A substantial portion of the second leading side is aligned parallel to second trailing side 14t2 and to a center plane 40-40 along an x-axis direction that bisects the main pole 14. In another embodiment (not shown), the tapered trailing side may be omitted such that trailing side 14t2 extends orthogonally from the ABS to a backside of the main pole. Leading gap 13 separates leading side 14b1 from the leading shield. Hot seed layer 17 has a first side 17s1 that faces and is parallel to tapered trailing side 14t1 and with a front end at the ABS, and a second side 17s2 that connects to a far end of the first side 17s1 and is aligned parallel to second trailing side 14t2. The hot seed layer typically has a uniform down-track thickness such that second trailing shield 19 has a first side 19s1 with a front end at the ABS and formed parallel to first side 17s1, and a second side 19s2 connected to an end of first side 19s1 and aligned parallel to second side 17s2. The second trailing shield and hot seed layer have a backside 19e and 17b, respectively, that are preferably aligned parallel to the ABS. Write gap 16 has a thickness d between first trailing side 14t1 and first side 17s1, and between second trailing side 14t2 and second side 17s2.

Figure 2A:
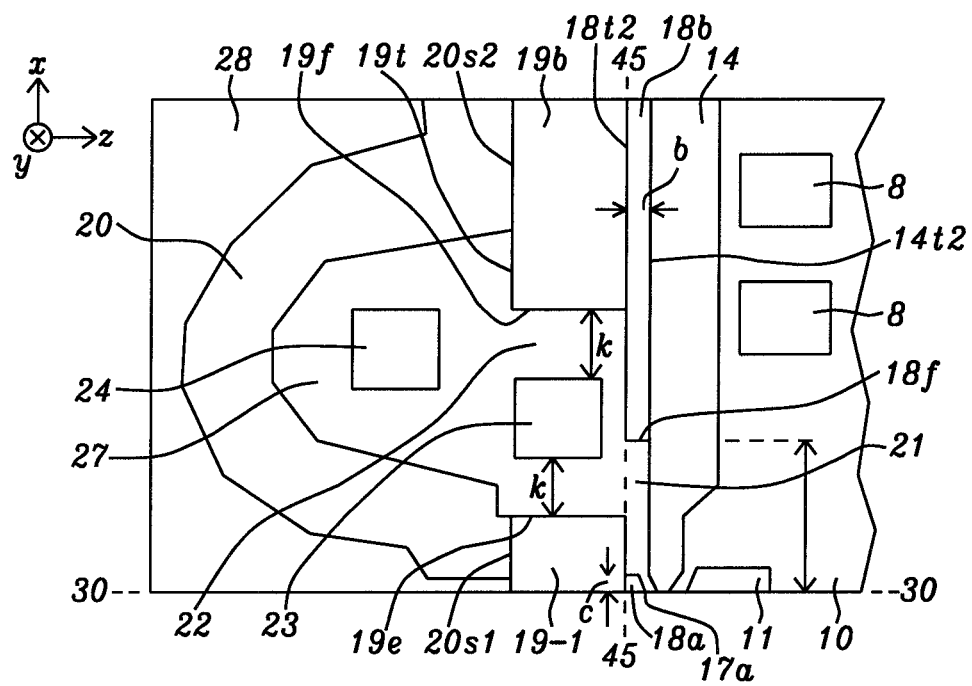
FIG. 2a is a down-track cross-sectional view of a PMR writer with a multilayer trailing shield structure formed according to an embodiment of the present disclosure wherein a 10-12 kG magnetic layer is included between the lower hot seed layer and the upper 16-19 kG layer at the ABS.

Referring to the down-track cross-sectional view of a first embodiment of the present disclosure depicted in FIG. 2a, we have discovered that a thicker BGC wherein a bottom BGC layer 18b with top surface 18t2 that is inserted between BGC layer 19b and main pole trailing side 14t2 is beneficial in accelerating writer speed. Preferably, bottom BGC layer front side 18f is at height a, and is substantially closer to the ABS than front side 19f of the upper BGC layer 19b. Moreover, POR spacing k between the driving coils 23 and near and far sides of the 16-19 kG magnetic layer 19-1, 19b, respectively, is maintained from the POR design to avoid a significant increase in complexity of fabrication. Note that trailing shield layer 19-1 is a modification of trailing shield layer 19a in the POR design where sides 19s1, 19s2 are removed and replaced by side 19s (FIG. 2b) that is aligned orthogonal to the ABS, contacts hot seed layer 17a, and has a front end at the ABS. Furthermore, the hot seed layer in the POR design is modified to remove a back portion such that only a front portion adjacent to main pole tapered side 14t1 is retained as explained later with regard to hot seed layer 17a in FIG. 2b.

The present disclosure is not limited to the 1+1+2T coil design in the exemplary embodiment, and anticipates that other well known coil schemes such as 1+1T, 2+2T, or 3+3T may be employed in alternative embodiments.

A key feature of the first embodiment is modification of the POR design to include a 10-12 kG magnetic layer with front portion 18a called the TS0 layer between 19-24 kG (hot seed) layer 17a and 16-19 kG trailing shield layer 19-1 in the trailing shield structure at the ABS. The 10-12 kG magnetic layer also has a back portion 18b called the TY0 layer that serves as the bottom layer in the BGC. Magnetic layers 19b, 20 are retained from the POR shield structure such that layers 17a, 18a, 19-1, 19b, and 18b form a trailing magnetic loop to a back portion of main pole trailing side 14t2. In the exemplary embodiment, the PMR writer has a so-called double deck layout where driving coils 23, 24 are stacked one above the other at different down-track distances from the main pole trailing side 14t2.

The TS0 and TY0 layers are separated by a dielectric layer 21 that contacts overlying dielectric layer 22 and underlying main pole trailing side 14t2 behind write gap 16. TY0 layer 18b preferably has a thickness b from 100 to 300 nm in order to optimize ATE, BPI, and writer speed (reduced rise time). Thickness b corresponds to the down-track distance between main pole trailing side 14t2 and plane 45-45 that is orthogonal to the ABS and includes top surface 18t2 of the TY0 layer and a top surface of the TS0 layer 18a. The insertion of the TS0 layer in the trailing shield is advantageous in controlling ATE in advanced shield designs.

Figure 2B:
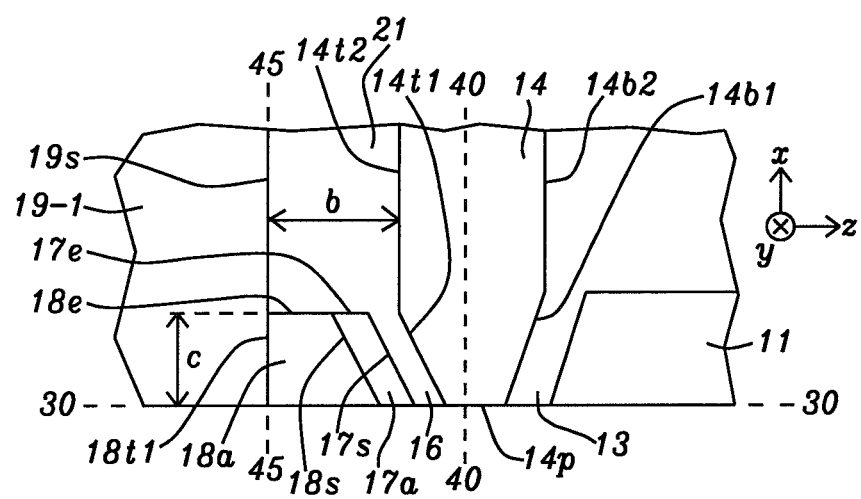
FIG. 2b is a top-down view of the multilayer trailing shield structure in FIG. 2a wherein the hot seed layer and 10-12 kG magnetic layer extend a first height from the ABS, and the tapered main pole trailing side has a front end at the ABS and is aligned parallel to a nearest side of the hot seed layer.

Another critical feature is a reduction in throat height (TH) from h in the POR structure to c in the first embodiment where TH is defined as the height of the back sides 17e, 18e of hot seed layer 17 and TS0 layer 18a, respectively, from the ABS 30-30. As a result, the down-track separation between the trailing shield structure (in this case layer 19-1) and second trailing side 14t2 becomes b which is substantially greater than distance d in the POR structure thereby enabling a smaller BER. TS layer 19-1 has a backside 19e that is preferably aligned parallel to the ABS. The near end 20s1 of PP3 trailing shield 20 adjoins the top surface of trailing shield layer 19-1 opposite to side 19s thereof (FIG. 2b). At the far end 20s2, the PP3 trailing shield contacts a top surface 19t of upper BGC layer 19b.

Referring to FIG. 2b, the trailing shield structure proximate to the main pole in FIG. 2a is enlarged to more clearly depict the 10-12 kG magnetic layer 18a that is between hot seed layer 17a and 16-19 kG trailing shield layer 19-1. Note that backside 17e of the hot seed layer and backside 18e of the 10-12 kG magnetic layer are both formed at throat height c from the ABS 30-30. There is a hot seed layer side 17s facing and aligned essentially parallel to main pole trailing side 14t1, and separated therefrom by the write gap 16. The 10-12 kG magnetic layer has a side 18s aligned parallel to side 17s and facing the main pole 14, a front end at the ABS, backside 18e at the TH distance and a top (trailing) side 18t1 at plane 45-45.

Compared with the POR structure, the height of the hot seed layer is decreased such that there is no longer a side thereof formed parallel to main pole trailing side 14t2 in the exemplary embodiment with a tapered trailing side 14t1.

Accordingly, there is a larger gap b between trailing side 14t2 and the trailing shield structure (side 19s of trailing shield layer 19-1) than distanced between side 17s2 and trailing side 14t2 in FIG. 1a, which is responsible for reducing BER in the PMR writer performance of the first embodiment. Side 19s of the 16-19 kG trailing shield layer faces the main pole, coincides with a top surface 18t1 of 10-12 kG magnetic layer 18a from the ABS to throat height c, is orthogonal to the ABS, and extends to a back side (19e in FIG. 2a) that is at a height greater than c. Note that plane 40-40 is orthogonal to the ABS and bisects the main pole 14 along an x-axis direction.

Figure 2C:
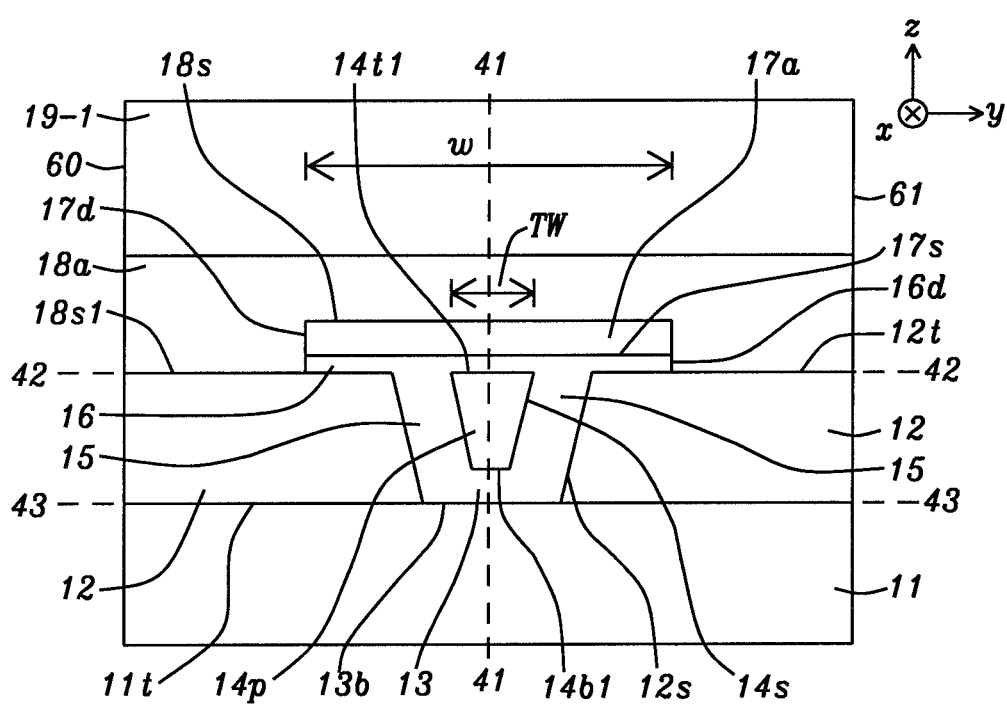
FIG. 2c is an ABS view of multilayer trailing shield structure in FIG. 2a wherein the trailing shield (TS) forms an AWA shield design with the side shields and leading shield according to an embodiment of the present disclosure.

According to one embodiment depicted in FIG. 2c, an ABS view of the trailing shield structure described in FIGS. 2a-2b is provided where there is an all wrap around (AWA) shield design. Main pole tip 14p has two sides 14s that connect trailing side 14t1 with leading side 14b1. Typically, the main pole tip has a trapezoid shape where the trailing side has a greater cross-track width (track width TW) than a cross-track width of the leading side. There is a lead gap 13 between leading side 14b1 and leading shield 11, and a side gap 15 between each side 14s and side 12s of side shield 12. Write gap 16 is formed on trailing side 14t1 and has a larger cross-track width w of 50-80 nm than TW. Gaps 13, 15, 16 are comprised of one or more non-magnetic materials such as $Al_2O_3$ and silicon oxide, and completely surround the main pole tip at the ABS.

The AWA shield structure comprises hot seed layer 17a formed on the write gap, and having a cross-track width w (preferably equal to that of the write gap), leading shield 11, side shields 12, 10-12 kG magnetic layer 18a, and 16-19 kG magnetic layer 19-1 where the shield structure surrounds the main pole. The magnetic material in the shield layers may be one or more of CoFe, CoFeNi, NiFe, and CoFeN. In a preferred embodiment, the leading shield and side shields are made of a 10-19 kG magnetic material. Center plane 41-41 is orthogonal to both of the ABS and plane 40-40 (not shown), and bisects the main pole such that each side 14s is equidistant from center plane 41-41. A front (ABS) edge of trailing side 14t1 is coplanar with top surfaces 12t of the side shields at plane 42-42 that is orthogonal to plane 41-41 and to the ABS. Outer portions of 10-12 kG magnetic layer 18a that are a greater cross-track distance from plane 41-41 than hot seed layer side 17d each have a bottom surface 18s1 that contacts a side shield top surface 12t at plane 42-42.

A bottom surface of each side shield adjoins leading shield top surface 11t at plane 43-43 that is parallel to plane 42-42. A bottom side 13b of the lead gap is also formed at plane 43-43 and adjoins the leading shield top surface. Both magnetic layers 18a, 19-1 have a full width in that they extend from one side 60 of the shield structure to the opposite side 61. Each of the write gap and hot seed layer have two sides 16d, 17d, respectively, that are formed equidistant from plane 41-41. Furthermore, bottom surface 17s of the hot seed layer adjoins a top surface of the write gap 16 and is preferably aligned parallel to plane 42-42.

A modeling experiment using Finite Element MicroMagnEtics (Femme) software was performed to demonstrate the benefits of a trailing shield structure depicted in FIG. 2a of the preferred embodiment. As a reference, the POR write head structure shown in FIG. 1a was assigned the following parameters: write gap 16 thickness d=22 nm, and throat height h=600 nm. Hot seed layer 17 is made of a 24 kG magnetic layer while trailing shield 19a, PP3 trailing shield 20, and BGC 19b are made of a 16 kG magnetic layer. In all examples, side shields are a 12 kG magnetic material. The following parameters are provided for a PMR writer according to the present disclosure: throat height (c)=250 nm; bottom BGC (TY0) layer 18b has a thickness b that is 100 nm, 200 nm, or 300 nm; front side 18f of the TY0 layer is recessed a distance a of 1.3 micron from the ABS; and the TS0 layer 18a and TY0 layer are made of a 10 kG magnetic material. PP3 trailing shield 20 and upper BGC layer 19b composition are the same as in the reference structure while trailing shield layer 19-1 is a 16 kG magnetic material.

Figure 3A:
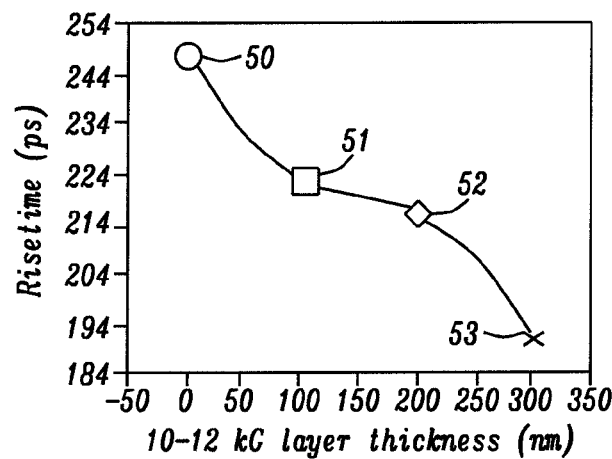
FIGS. 3a-3f are drawings showing the effect of the 10-12 kG TS magnetic layer thickness on rise time, Hy return field, down track gradient, erase width in AC mode (EWAC), Hy field, and cross-track gradient, respectively.

FIG. 3a shows that writer risetime becomes substantially faster as TY0 thickness b increases from 0 in the reference (point 50) to 300 nm (point 53) in an embodiment of the present disclosure. In all of FIGS. 3a-3f, the reference is represented by point 50, and points 51, 52, 53 represent TY0 thicknesses of 100 nm, 200 nm, and 300 nm, respectively. With every 100 nm increase in TY0 thickness, risetime is improved by 5% to 10%.

Figure 3B:
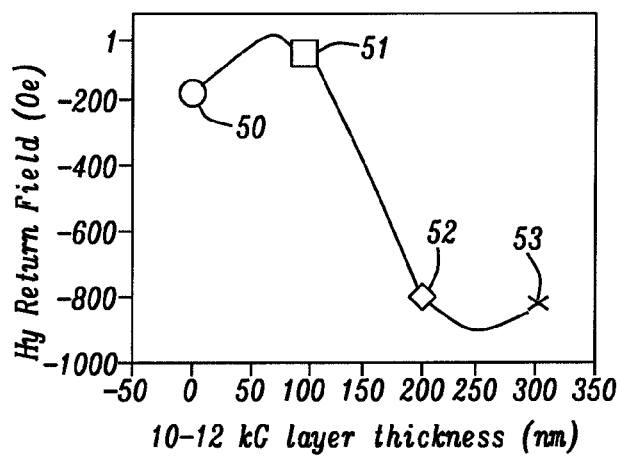

FIG. 3b illustrates the advantage in higher return field for the embodiments where TY0 layer thickness is 200 nm to 300 nm. As indicated earlier, a larger opening between the main pole trailing side 14t2 and trailing shield structure (layer 19-1) is responsible for an improved return field. Although b=100 nm has no effect on the trailing side response (see points 50, 51), when b reaches 200 nm or larger, there is a significant impact on reducing the risetime as shown by points 52, 53.

Figure 3C:
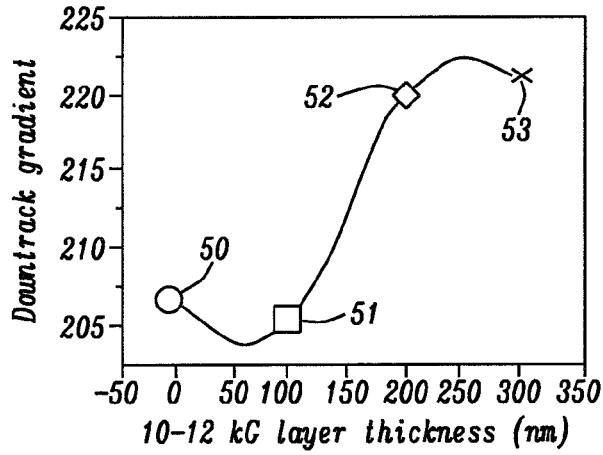

Regarding the down-track (DT) gradient in FIG. 3c, about a 1.5% BPI gain is projected for TY0 thickness in the range of 200 nm to 300 nm.

Figure 3D:
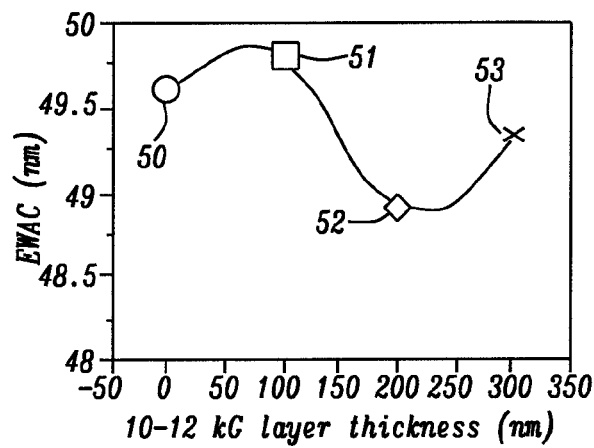
Figure 3E:
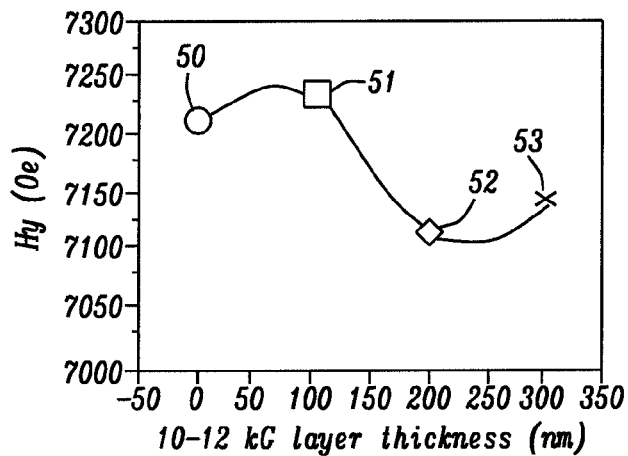
Figure 3F:
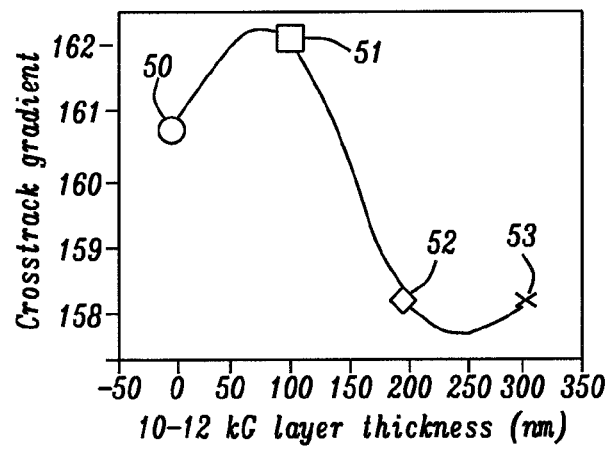

In FIG. 3d and FIG. 3e, erase width in AC mode (EWAC) and Hy field show an insignificant difference among the reference and embodiments of the present disclosure. Moreover, the cross-track gradient in FIG. 3f shows slightly less favorable results for points 52, 53. In summary, we find that the PMR writer of the present disclosure enables improved BPI and writer speed without significant loss in other writer properties, especially for a TY0 thickness b of 200 nm to 300 nm.

In other embodiments, TY0 thickness may be increased to 700 nm and is associated with a corresponding thickness increase in trailing shield (TS0) layer 18a. However, the advantage of faster risetime when increasing thickness b above 300 nm to as high as 700 nm may be offset by moving trailing shield layer 19-1 farther from the main pole and reducing the related BER benefit. Note that total trailing shield thickness (combined layers 18a, 19-1) at the ABS above plane 42-42 in FIG. 2c is maintained at approximately 1000 nm. Thus, increasing TS layer 18a thickness means TS layer 19-1 thickness is decreased thereby decreasing trailing shield volume in the two layers in embodiments where TS layer 18a has a throat height c that is substantially less than height h for TS layer 19-1. Accordingly, BER may be degraded because of a reduction in the high Ms TS layer 19-1 volume.

Figure 4:
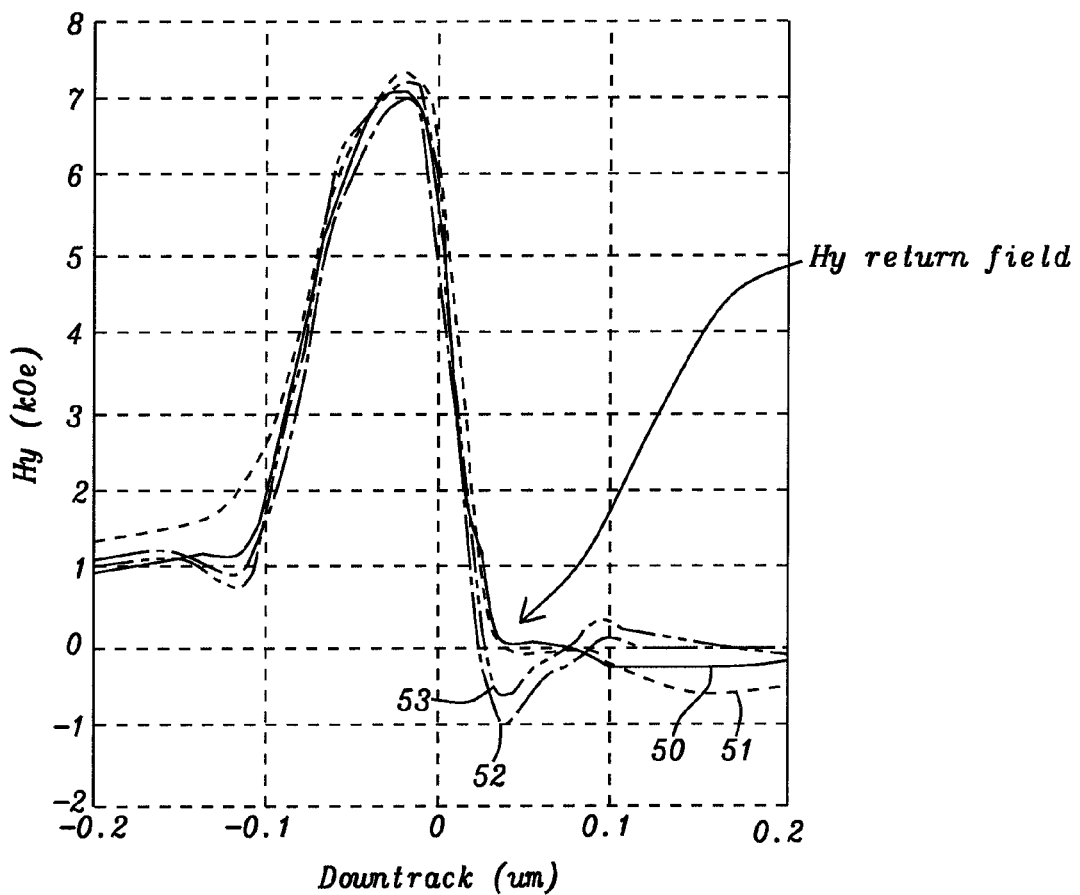
FIG. 4 is a down track profile (Hy field vs. down-track position) for a PMR writer having a multilayer trailing shield formed according to an embodiment of the present disclosure.

Referring to FIG. 4, a plot of Hy field vs. down-track position is shown and reveals that TY0 thicknesses of 200 nm or 300 nm (points 52, 53) provide a significant improvement in return field compared with the POR structure. The measurement is taken at a maximum negative value for Hy at a down-track position between 0 and 0.1 micron from the center track.

Figure 5A:
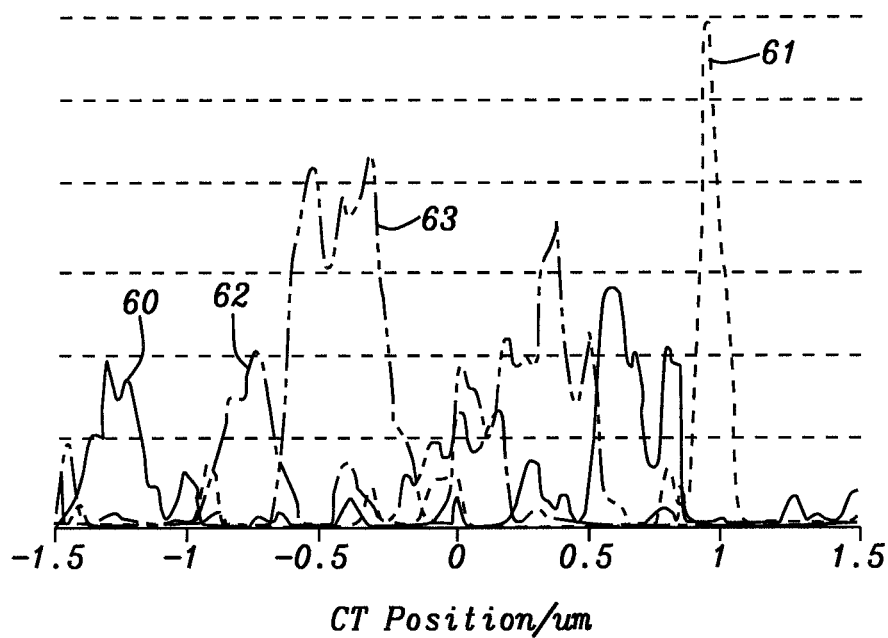
FIGS. 5a-5b are drawings that show ATE as a function of 10-12 kG TS magnetic layer thickness in a PMR writer with a multilayer trailing shield of the present disclosure in comparison with a POR PMR writer at a 1500 Oe threshold, and 2000 Oe threshold, respectively.
Figure 5B:
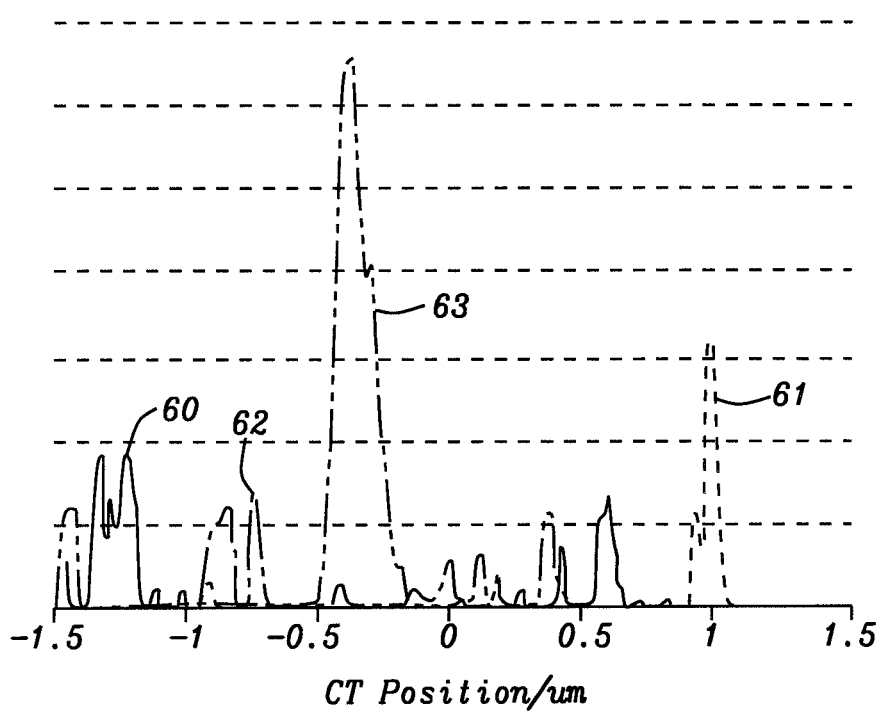
Figure 6:
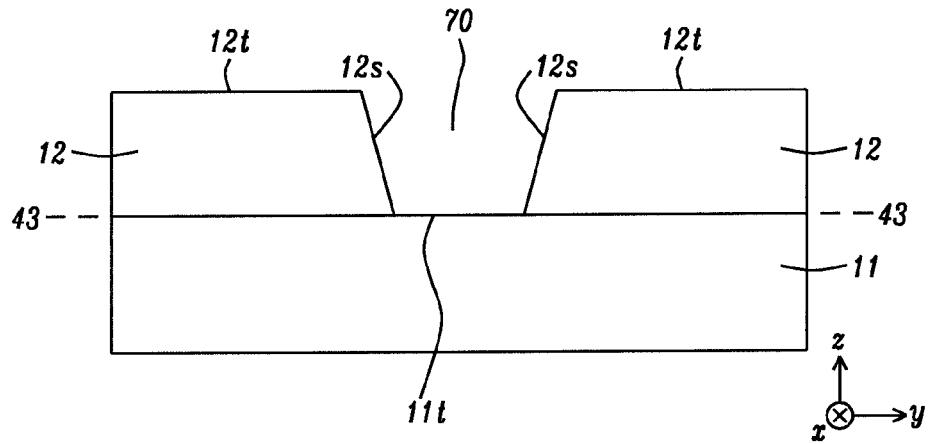
FIGS. 6-8 are ABS views showing a sequence of steps for forming a multilayer trailing shield structure according to an embodiment of the present disclosure.

In FIG. 5a and FIG. 5b, modeling results are illustrated in the form of trailing shield related ATE plots for a write head having different TY0 thicknesses with a 1500 Oe and 2000 Oe threshold, respectively. Curve 60 represents the POR design in FIG. 1a where there is no 10-12 kG magnetic layer in the trailing shield. Curves 61, 62, 63 show the results for the trailing shield structure of the present disclosure in FIG.

2a where b=100 nm, 200 nm, 300 nm, respectively. We observe that ATE is significantly improved when TY0 thickness is 100 nm or 200 nm compared with the POR design. When TY0 thickness is 300 nm, trailing shield ATE is worse than the POR example near the cross-track center position but is cleaner at the far sides. Therefore, we have demonstrated that not only are BPI and writer speed improved by implementing a trailing shield structure according to the present disclosure, but cleaner trailing shield ATE is also realized.

The present disclosure also encompasses a method of fabricating the AWA shield structure depicted in FIG. 2c. It should be understood by those skilled in the art that the production sequence follows conventional methods through the deposition of leading shield layer 11. The process flow to form the shield structure disclosed previously begins by providing leading shield layer 11 shown from a cross-sectional view at a plane that will become the ABS in the final device. A top surface 11t of the leading shield is at plane 43-43 that is orthogonal to the ABS. Thereafter, side shield layer 12 is formed on the leading shield and an opening 70 is formed in the side shield to yield sides 12s that extend from top surface 12t to top surface 11t at plane 43-43. The opening is formed by a conventional sequence of steps that typically involve coating and patterning a photoresist layer (not shown) to form an opening therein that uncovers a portion of top surface 12t on the side shield layer, and then reactive ion etching (RIE) to remove portions of the side shield that are exposed by the opening in the photoresist layer. After the RIE step stops at top surface 11t, a conventional stripping process is employed to remove the photoresist layer.

Figure 7:
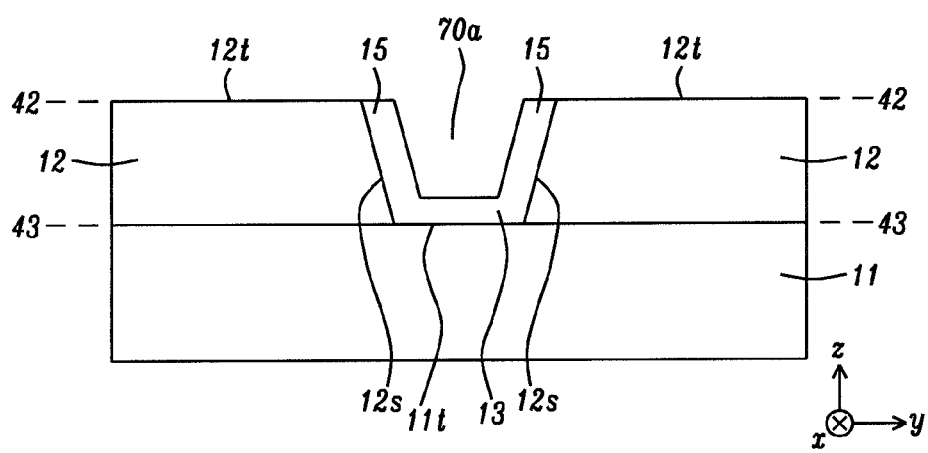

In FIG. 7, a dielectric material is conformally deposited by a plasma enhanced chemical vapor deposition (PECVD) method or the like on the sides 12s and top surface 11t to partially fill the opening and form a smaller opening 70a. As a result, leading gap 13 is formed on top surface 11t and side gaps 15 are generated on sides 12s. The leading gap and side gap layers may be comprised of one or more dielectric materials including alumina, silica, and other metal oxides, nitrides, or oxynitrides. On the aforementioned gap layers, there may also be an uppermost metal layer (not shown) such as Ru that promotes a uniform main pole layer during a subsequent plating process.

Figure 8:
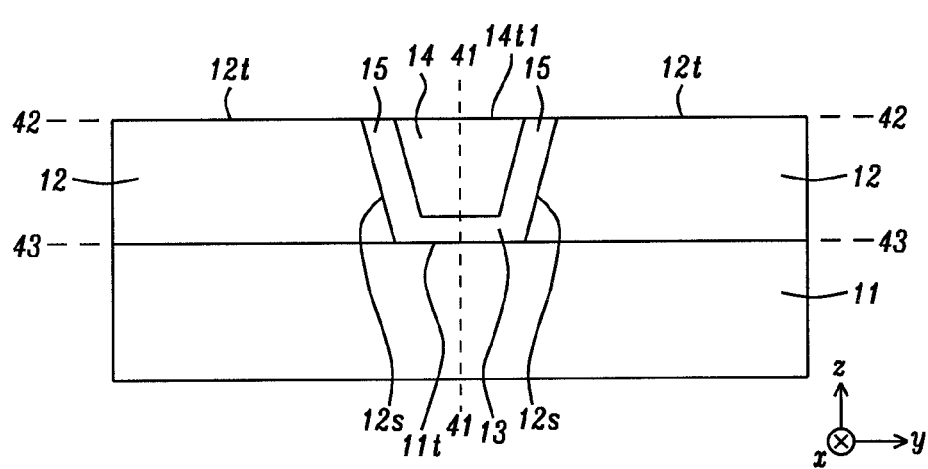

Referring to FIG. 8, main pole layer 14 is plated by a conventional method and then a chemical mechanical polish (CMP) process is performed to generate a trailing side 14t1 that is coplanar with top surfaces 12t of side shields 12. Those skilled in the art will appreciate that at this point, a well known process sequence may be employed to form a taper on the trailing side 14t1 such that a down-track distance between the trailing side and plane 42-42 becomes greater with increasing distance from the ABS up to throat height c as illustrated in FIG. 2b. Note that plane 42-42 is not shown in FIG. 2b in order to simplify the drawing, but said plane intersects the ABS 30-30 at a front end of trailing side 14t1 and is aligned parallel to plane 40-40.

Figure 9:
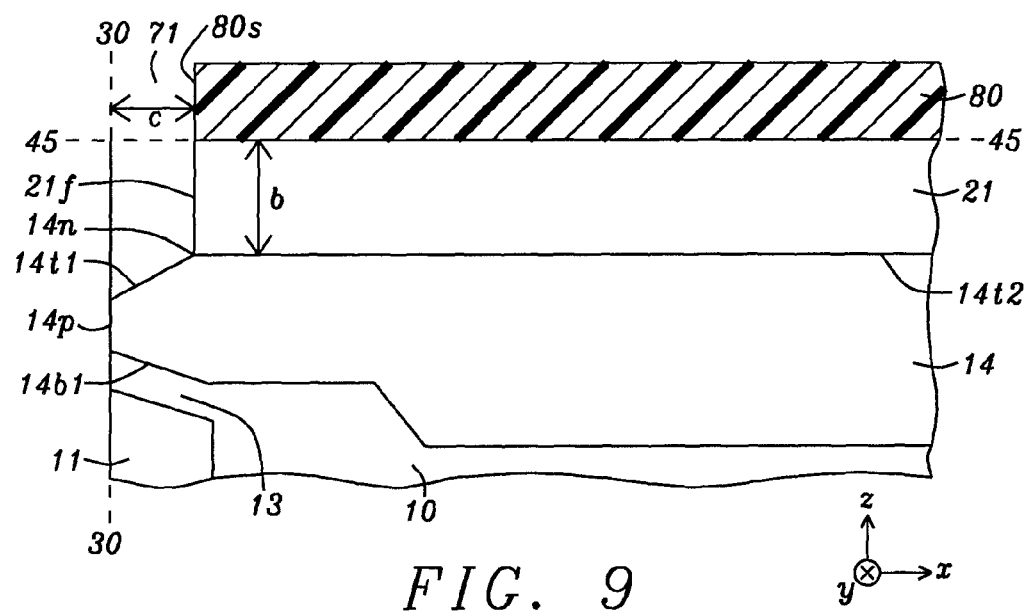
FIGS. 9-10 are down-track cross-sectional views depicting a sequence of steps for forming the write gap and hot seed magnetic layer on a trailing main pole side according to an embodiment of the present disclosure.

With regard to FIG. 9, a down-track cross-sectional view is shown of the structure in FIG. 8 along plane 41-41 after a dielectric layer 21 is deposited by a PECVD process or the like on tapered trailing side 14t1 and on trailing side 14t2 which extends from a back end 14n of the tapered trailing side towards a back end (not shown) of the main pole. Dielectric layer 21 may be made of one of the materials previously mentioned with respect to gap layer composition, and preferably has a down-track thickness b from about 100 nm to 300 nm.

A photoresist layer 80 is coated on dielectric layer 21 and patterned by a photolithography process to form an opening 71 between a front side 80s of the photoresist layer and the eventual ABS 30-30. It should be understood that the ABS is formed by a lapping process after all layers in the write head are fabricated. At this point, plane 30-30 is not an exposed surface and is used only to represent the eventual location of the ABS. Next, a RIE step may be used to remove portions of dielectric layer 21 that are exposed by opening 71. The etch process stops on tapered trailing side 14t1 and thereby generates a front side 21f of the dielectric layer that connects trailing side back end 14n to front side 80s. Front side 21f is at height c from plane 30-30 and is parallel thereto.

Figure 10:
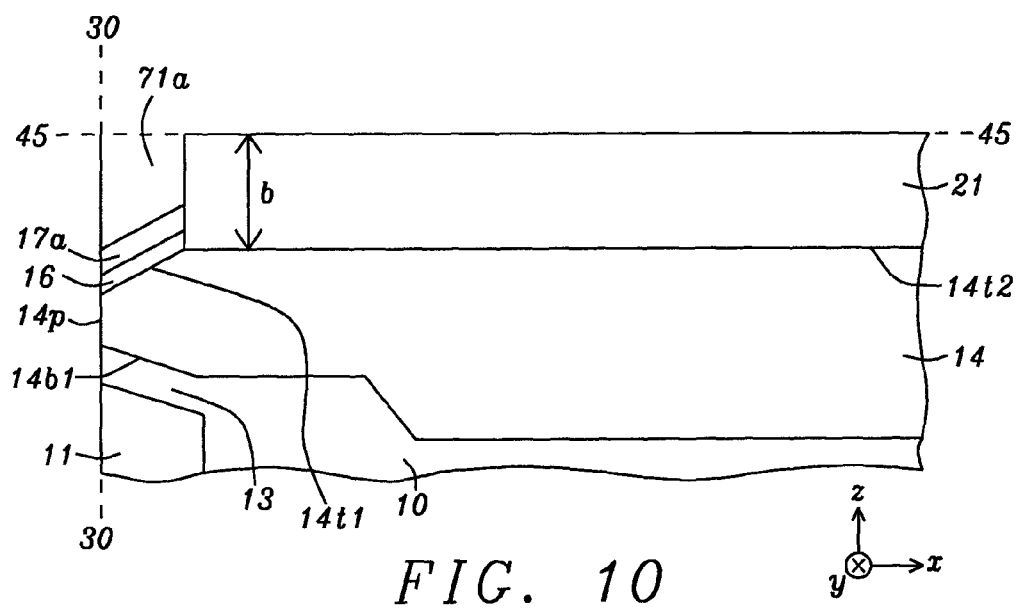

Referring to FIG. 10, the write gap 16 and hot seed layer 17a are sequentially deposited on main pole trailing side 14t1 and thereby leave an opening 71a between a top surface of the hot seed layer and plane 45-45 in the down-track direction, and between plane 30-30 and front side 21f along the x-axis direction. Next, the photoresist layer 80 is removed by a conventional method.

Figure 11:
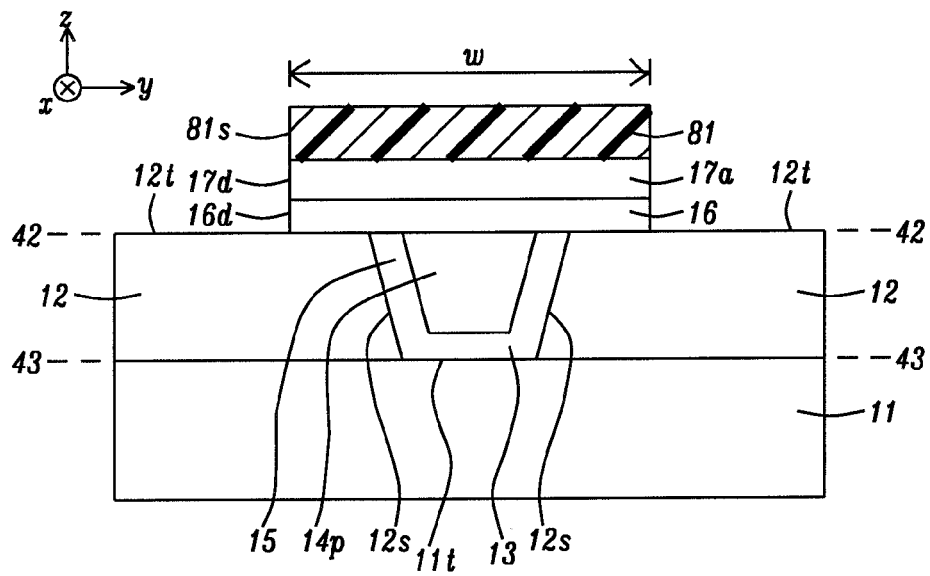
FIG. 11 is an ABS view depicting a method of forming a cross-track width in the write gap and hot seed magnetic layers that were deposited in FIG. 10.

From a perspective along plane 30-30 in FIG. 11, another photoresist layer 81 is coated on hot seed layer 17a and on dielectric layer 21 behind the plane of the paper. A photolithography process is employed to generate a pattern in the photoresist layer with sides 81s that are separated by the desired cross-track width w. Then, another RIE process is used to remove portions of the write gap 16 and hot seed layer that are not protected by the photoresist layer, and finally stops at plane 42-42 that corresponds to top surface 12t of the side shields 12. As a result, sides 16d and 17d are formed on the write gap and hot seed layer, respectively, and are essentially coplanar with a side 81s in the photoresist layer.

Figure 12:
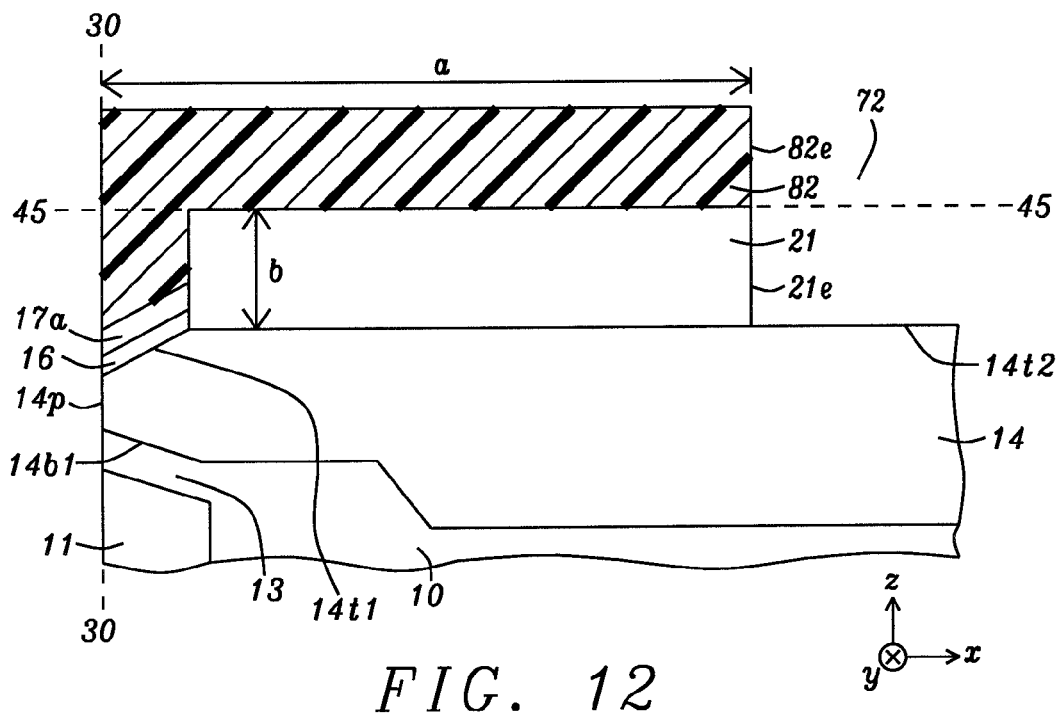
FIGS. 12-13 are down-track cross-sectional views showing a step sequence of forming a 10-12 kG magnetic layer after forming the cross-track width in FIG. 11.

In FIG. 12, a down-track cross-sectional view of the structure in FIG. 11 is illustrated after the photoresist layer 81 is removed. Another photoresist layer 82 is coated on the hot seed layer 17a and on dielectric layer 21. Thereafter, the photoresist layer is patterned to form an opening 72 behind photoresist layer backside 82e that is at a height a from plane 30-30, and above plane 45-45. Subsequently, the opening 72 is expanded downward to main pole trailing side 14t2 by a RIE step that removes portions of dielectric layer that are not protected by photoresist layer 82. Accordingly, backside 21e of the dielectric layer is produced that is essentially coplanar with back side 82e at a distance a from plane 30-30.

Figure 13:
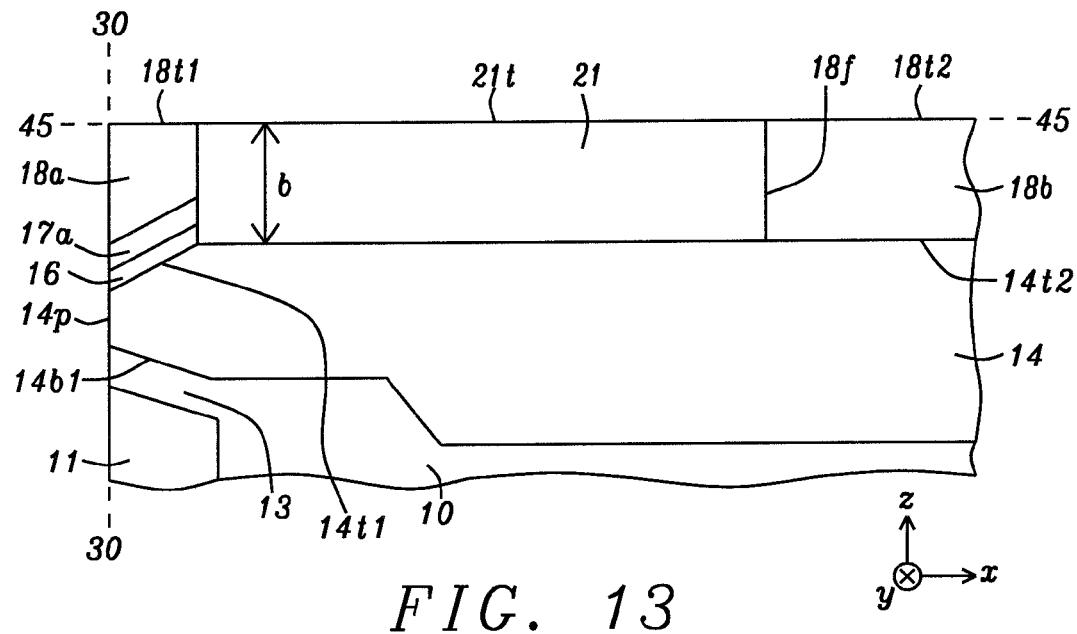

As shown in FIG. 13, photoresist layer 82 is stripped by a well known method and then a 10-12 kG magnetic layer is plated on the hot seed layer to provide trailing shield layer 18a, and on a portion of trailing side 14t2 to yield lower BGC layer 18b. Then, a CMP process is performed to generate a top surface 18t1 on layer 18a that is coplanar with a top surface 18t2 on layer 18b, and with top surface 21t on dielectric layer 21.

Figure 14:
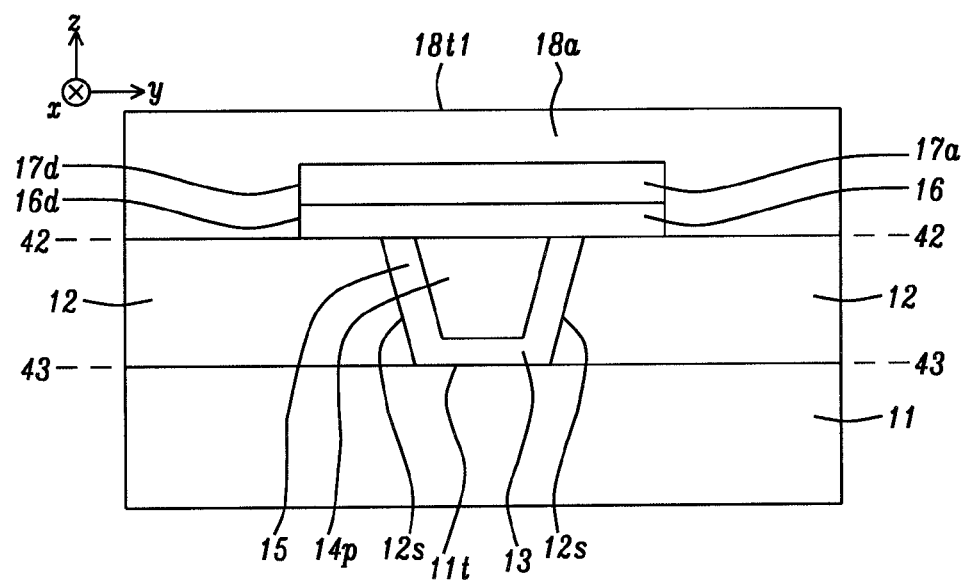
FIG. 14 is an ABS view of the PMR writer after the process in FIG. 13.

Referring to FIG. 14, a cross-sectional view at plane 30-30 is shown of the shield structure in FIG. 13. Trailing shield layer 18a adjoins a top surface of hot seed layer 17a, and also contacts side shield layer 12 at plane 42-42 along portions thereof that are not covered by write gap 16.

Thereafter, the remaining layers in the write head including the 16-19 kG trailing shield layer 19-1, PP3 trailing shield 20, driving coils 23, 24, and cover layer 28 are fabricated by methods well known to those skilled in the art.

In summary, we have disclosed how the insertion of a thin 10-12 kG magnetic layer between a hot seed layer and a 16-19 kG magnetic layer in the trailing shield structure, and between the main pole and a 16-19 kG magnetic layer in the back gap connection provides enhanced PMR writer performance by reducing trailing shield ATE and improving BPI and risetime. BER performance is attributed primarily to maintaining an acceptable volume of 16-19 kG trailing shield layer 19-1 with a first height h. BER is improved over the prior art by inserting a 10-12 kG trailing shield layer 18a between the hot seed layer and 16-19 kG TS layer where the 10-12 kG TS layer has a shorter throat height c where c<h. Faster risetime is realized by moving a front side of the 10-12 kG BGC layer closer to the ABS than a front side of the 16-19 kG BGC layer.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer, comprising:
   (a) a main pole with a leading side and a trailing side at an air bearing surface (ABS), and two sides that connect the leading side and trailing side and are formed equidistant from a center plane that is orthogonal to the ABS;
   (b) a gap layer surrounding the main pole at the ABS and comprising a write gap having a bottom surface that contacts the trailing side at a first plane that is orthogonal to the center plane and ABS, and has a top surface, the write gap has a first cross-track width between a first side and a second side that each have an end at the first plane and are formed equidistant from the center plane;
   (c) a trailing shield structure, comprising;
      (1) a 19-24 kG (hot seed) magnetic layer adjoining the write gap top surface, and having the first cross-track width between two sides that are equidistant from the center plane, the hot seed magnetic layer extends to a back side that is a first height from the ABS;
      (2) a 10-12 kG magnetic layer at the ABS and adjoining a top surface and the two sides of the hot seed magnetic layer, and extending to a back side that is the first height from the ABS;
      (3) a 16-19 kG magnetic layer at the ABS that contacts a top surface of the 10-12 kG magnetic layer and extends a second height to a back side that is greater than the first height from the ABS; and
      (4) a PP3 trailing shield layer that is recessed from the ABS and has a first end contacting a top surface of the 16-19 kG magnetic layer, and a back end contacting a top surface of an upper layer in a back gap connection to the main pole; and
   (d) the back gap connection having the upper layer that is a 16-19 kG magnetic material with a front side facing the ABS and formed a first distance therefrom, and a lower layer made of a 10-12 kG magnetic material that contacts a trailing main pole side which is aligned orthogonal to the ABS, the lower layer has a front side facing the ABS and formed a second distance therefrom that is less than the first distance, the lower layer has a first down-track thickness between the upper layer and the trailing main pole side that is orthogonal to the ABS.

2. The PMR writer of claim 1 wherein the front side of the 10-12 kG lower magnetic layer in the back gap connection is about 1.0 to 2.0 microns from the ABS.

3. The PMR writer of claim 1 wherein the first down-track thickness is from about 100 nm to 700 nm.

4. The PMR writer of claim 1 wherein the first height is a throat height and is about 50 to 500 nm.

5. The PMR writer of claim 1 wherein the first cross-track width is greater than a track width of the main pole trailing side at the ABS.

6. The PMR writer of claim 1 wherein the top surface of the 10-12 kG trailing shield magnetic layer and the top surface of the 10-12 kG lower magnetic layer in the back gap connection are coplanar along a plane that is orthogonal to the ABS.

7. The PMR writer of claim 1 wherein each of the hot seed magnetic layer and 10-12 kG trailing shield magnetic layer have a first side that faces and is formed parallel to a main pole trailing side with an end at the ABS.

8. The PMR writer of claim 7 wherein the main pole trailing side with an end at the ABS is tapered with respect to a plane that is orthogonal to the ABS, and extends to a back end that is at the first height from the ABS.

9. The PMR writer of claim 1 wherein driving coils are formed in a dielectric layer that is between a back side of the 16-19 kG trailing shield magnetic layer and a front side of the 16-19 kG upper magnetic layer in the back gap connection.

10. A perpendicular magnetic recording (PMR) writer with an all wrap around (AWA) shield structure, comprising:
    (a) a main pole with a leading side at an air bearing surface (ABS), and a trailing side at the ABS and formed at a first plane that is orthogonal to the ABS and to a center plane formed equidistant between two main pole sides that connect the leading side and the trailing side;
    (b) a gap layer surrounding the main pole at the ABS and comprising a write gap that contacts the trailing side and has a first cross-track width between a first side and a second side at the first plane and formed equidistant from the center plane, a side gap layer adjoining each of the two main pole sides, and a lead gap contacting the leading side;
    (c) the AWA shield structure, comprising;
       (1) a trailing shield, comprising
          a 19-24 kG (hot seed) magnetic layer contacting a top surface of the write gap, and having the first cross-track width between two sides that are formed equidistant from the center plane, the hot seed magnetic layer extends from the ABS to a backside at a first height from the ABS;
          a 10-12 kG magnetic layer at the ABS that adjoins a top surface and the two sides of the hot seed magnetic layer, and contacts a top surface of each of two side shields at the first plane, and extends to a backside that is at the first height from the ABS; and
          a 16-19 kG magnetic layer that contacts a top surface of the 10-12 kG magnetic layer at the ABS and extends a second height to a backside that is greater than the first height from the ABS;
       (2) a side shield formed on each side of the center plane and contacting one of the side gaps, each side shield has a bottom surface at a second plane that is parallel to the first plane; and
       (3) a leading shield having a top surface that adjoins each side shield bottom surface and a bottom surface of the lead gap at the second plane; and
    (d) a back gap connection having an upper layer made of a 16-19 kG magnetic material and a lower layer made of a 10-12 kG magnetic material that adjoins a main pole trailing side that is orthogonal to the ABS, has a first down-track thickness between the upper layer and main pole trailing side that is orthogonal to the ABS, and has a front side at a second height from the ABS.

11. The PMR writer of claim 10 wherein the front side of the 10-12 kG lower magnetic layer in the back gap connection is about 1.0 to 2.0 microns from the ABS.

12. The PMR writer of claim 11 wherein the 16-19 kG upper magnetic layer in the back gap connection has a front side that is a greater distance from the ABS than the second height of the 10-12 kG lower magnetic layer.

13. The PMR writer of claim 10 wherein the first down-track thickness is from about 100 nm to 700 nm.

14. The PMR writer of claim 10 wherein the first height is a throat height and is about 50 to 500 nm.

15. The PMR writer of claim 10 wherein the leading shield and side shields are made of a 10-19 kG magnetic material.

16. The PMR writer of claim 10 wherein each of the hot seed magnetic layer and 10-12 kG trailing shield magnetic layer have a first side that faces and is formed parallel to a main pole trailing side with an end at the ABS.

17. The PMR writer of claim 16 wherein the main pole trailing side with an end at the ABS is tapered with respect to a plane that is orthogonal to the ABS, and extends to a back end that is at the first height from the ABS.

18. The PMR writer of claim 10 wherein the first cross-track width is about 50 to 80 nm and is greater than a track-width of the main pole trailing side at the ABS.

19. A method of forming a perpendicular magnetic recording (PMR) writer, comprising:
   (a) providing a side shield layer on a leading shield, and forming an opening with sides in the side shield layer that exposes a top surface of the leading shield;
   (b) depositing a gap layer on the leading shield top surface and on the sides of the opening to partially fill the opening, and then plating a main pole layer on the gap layer to fill the opening;
   (c) performing a chemical mechanical polish (CMP) process to form a first plane that includes a top surface (trailing side) of the main pole layer, and top surfaces of the side shield layer on either side of a center plane that bisects the main pole layer and is orthogonal to the first plane;
   (d) sequentially depositing a write gap and a 19-24 kG hot seed magnetic layer on the top surfaces of the main pole layer and the side shield layers;
   (e) performing an etching process to form sides on each of the write gap and hot seed magnetic layer that are equidistant from the center plane, the write gap sides intersect the first plane;
   (f) depositing a 10-12 kG magnetic layer with a front portion on a top surface and sides of the hot seed magnetic layer at a second plane that subsequently becomes an air bearing surface (ABS), and with a back portion on a portion of a trailing side of the main pole layer; and
   (g) depositing a 16-19 kG magnetic layer with a front portion on a top surface of the front portion of the 10-12 kG magnetic layer, and with a back portion on the back portion of the 10-12 kG magnetic layer, the back portions of the 10-12 kG and 16-19 kG magnetic layers form a back gap connection to the main pole layer, and the front portions of the 10-12 kG magnetic layer and 16-19 kG magnetic layer together with the hot seed magnetic layer form a trailing shield structure at the ABS.

20. The method of claim 19 wherein the side shield layer and leading shield are made of a 10-19 kG material.

21. The method of claim 19 wherein the back portion of the 10-12 kG magnetic layer has a down-track thickness of about 100 to 700 nm.

22. The method of claim 19 wherein the back portion of the 10-12 kG magnetic layer has a front side that is recessed from the ABS by a distance of about 1 to 2 microns.

23. The method of claim 19 further comprised of forming a PP3 trailing shield that connects the front portion of the 16-19 kG magnetic layer to the back portion of the 16-19 kG magnetic layer.

24. The method of claim 19 wherein the front portion of the 10-12 kG magnetic layer extends from the ABS to a backside that is at a throat height of 50 to 500 nm from the ABS.

25. The method of claim 24 wherein the write gap extends from the ABS to a backside that is at the throat height.

26. The method of claim 24 further comprised of tapering the top surface of the main pole layer before depositing the write gap to form a first tapered trailing side that extends from a front end at the ABS to a back end at the throat height, and forms a second trailing side that extends orthogonally with respect to the ABS from the back end of the first tapered trailing side toward a back end of the main pole layer.

27. The method of claim 19 wherein the sides of each of the write gap and the hot seed magnetic layer are separated by a first cross-track width that is greater than a track width of a trailing side of the main pole layer at the ABS.

* * * * *